Dec. 27, 1932.  M. H. PAGE  1,892,218
FILM PASS
Filed Dec. 17, 1929
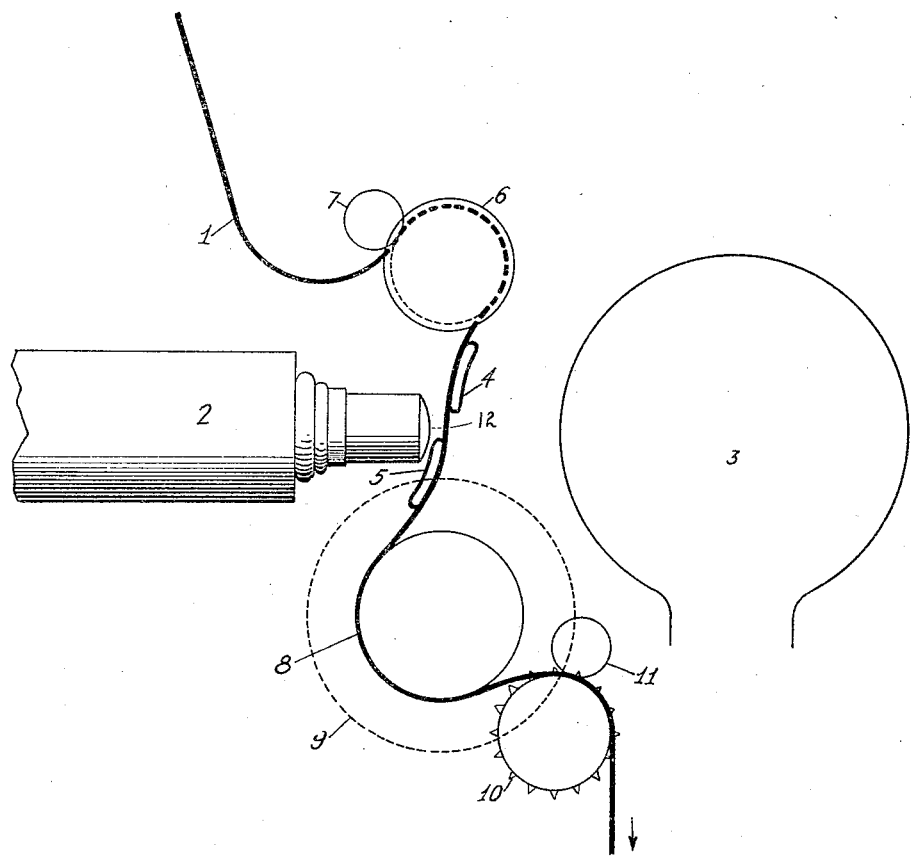
INVENTOR
MILTON H. PAGE
BY
ATTORNEY Patented Dec. 27, 1932

1,892,218

UNITED STATES PATENT OFFICE

MILTON HARRISON PAGE, OF COHOES, NEW YORK, ASSIGNOR TO RADIO CORPORATION OF AMERICA, A CORPORATION OF DELAWARE

FILM PASS

Application filed December 17, 1929. Serial No. 414,634.

The object of this invention is to provide an improved system and method for photo-electric sound recording and reproducing.

A further object of this invention is to provide means for moving the film upon which the sound is recorded past the recording or reproducing point in an improved manner.

A more particular object of this invention is to hold the film steady at the recording or reproducing point, and to cause it to have a uniform motion at said point.

These and further objects of this invention will become apparent from the following specification taken in connection with the appended drawing.

In the recording or reproduction of sound upon a moving film record, it has been found necessary to focus the light either representative of the sound being recorded or the light which it is desired to have modulated by the film, in the process of recording and reproducing respectively, in a very thin line transverse with respect to the sound track. Focusing of the light in this manner necessitates the use of microscopic optical system in which the distance of the film from the objective is of critical importance. In other words, the distance must be maintained constant within a high degree of accuracy in order that the system may be maintained in focus to prevent light dispersion with consequent blurring of the recorded or reproduced sound.

While various means have been used for accomplishing this object, it is the primary object of the present invention to provide a new and improved system for accomplishing this end.

In accomplishing the objects of this invention, I provide two stationary guide shoes over which the film is adapted to pass, one of said guide shoes being adapted to co-act with said film on one side, and causing it to assume a curvilinear motion in one direction, and the other of said guide shoes being adapted to co-act with the film on the other side, and being adapted to cause the film to travel in a curvilinear direction opposite to that caused by the first guide shoe. The objective system is arranged to act upon the film at the point intermediate of the two guide shoes at which point the film is travelling in a straight line. At this point, therefore, the film moves exactly in focus throughout the distance necessary for the reproduction and recording, and yet, it is supported in a perfectly rigid manner so that it cannot move to or from the objective to get out of focus.

In order to produce a uniform motion of the film at the recording and reproducing point, the film passes between two guide rollers before passing the first guide shoe, and is pulled from the two guide shoes and passes over a free roller to which a small fly-wheel is attached. The film is pulled around this free roller by the action of a driving sprocket, but the ripple which would otherwise be caused by the driving sprocket is filtered out by the fly-wheel.

Having thus briefly described my invention, I now invite attention to the accompanying drawing in which the single figure shows a schematic diagram illustrating it as applied to a reproducing apparatus.

Attention is now more particularly invited to the figure, in which the film upon which the sound has been recorded is designated as 1. The optical system 2 focuses light from the reproducing light source (not shown) upon the film record 1 at the point 12. The light passing through the film and falling upon the photo-electric cell 3 is thus varied due to its passage through the film record. The curved guide shoes 4 and 5 are arranged as shown to support the film on the opposite sides thereof, and to cause it to be moved in an opposite curvilinear direction on the two sides of the reproducing point 12.

The film on entering the reproducing device passes around the guide roller 6 against which it is held by the pressure roller 7 in the usual and well known manner. Thence, after passing the guide shoes 4 and 5 and the reproducing point 12, the film is drawn around the free roller 8 by the action of the driving sprocket 10 against which the film is held by the idler 11. Attached to the shaft of the free roller 8 is a small fly-wheel generally designated as 9.

The film is thus drawn through the reproducing device by the action of the driven sprocket 10, and is pulled around the free roller 8 which, because of the action of the small fly-wheel 9, tends to move it a uniform speed and remove the ripple which would be otherwise caused by the teeth of the sprocket 10. The film is drawn from the motion picture device, which is usually disposed above, around the guide roller 6 and between the shoes 4 and 5, the latter of which tend to hold it in a steady position at the point 12, at which position the optical system focuses the reproducing light.

The system used in recording is identical with respect to the features of this invention, to that described for reproducing. It differs from this system only in that no photo-electric cell is used, and that the light is varied in the usual manner by the sound being recorded.

Having thus described my invention, attention is invited to the fact that various modifications may be made differing from the above disclosure but that I am not to be limited by the specific form shown and described for the purpose of illustration but by the scope of my invention as set forth in the appended claims.

I claim:

1. Apparatus for controlling the motion of a moving film for use in sound recording and reproduction which includes, a stationary curvilinear guide means adapted to co-act with the film on one side thereof, and a second curvilinear guide adapted to co-act with said film on the opposite side thereof, said guides being so disposed that the motion of the film therebetween is a straight line.

2. Apparatus for controlling the motion of the moving film for use in sound recording and reproduction which includes stationary curvilinear guide means adapted to co-act with the film on the opposite sides and at different sections thereof, and an optical system adapted to be focused upon said film at a point between said guide means, whereby said film will always be in focus with respect to said optical system.

3. Apparatus for controlling the motion of a moving film for use in sound recording and reproduction which includes means for moving the film, stationary curvilinear guide means adapted to co-act with the film on one side thereof, a second stationary curvilinear guide means adapted to co-act with said film on the opposite side thereof, said guide means being so disposed that the motion of the film therebetween is a straight line, tangent to the curves of both guide means, and an optical system adapted to be focused upon said film at the point between said guide means where its motion is a straight line, whereby said film will always be in focus with respect to said optical system.

4. Apparatus for controlling the motion of a moving film for use in sound recording and reproduction which comprises continuously rotating means for moving the film, a free roller over which said film is adapted to be pulled by said means, a fly-wheel attached to said roller to cause its motion to be uniform and thereby filter out the ripple caused by said sprocket, a curvilinear guide means adapted to co-act with said film on one side thereof, a second curvilinear guide means adapted to co-act with said film on the opposite side thereof, said guide means being so disposed that the motion of the film therebetween is a straight line, and an optical system adapted to be focused upon said film at the point between said guide means where its motion is a straight line, whereby said film will always be in focus with respect to said optical system.

5. Apparatus for controlling the motion of a moving film for use in sound recording and reproduction which comprises, a continuously rotating sprocket for moving the film, a roller adapted to maintain said film in contact with said sprocket, a free roller over which said film is adapted to be pulled by said sprocket, a fly-wheel attached to said roller to cause its motion to be uniform and thereby filter out the ripple caused by said sprocket, a curvilinear guide means adapted to co-act with said film on one side thereof, a second curvilinear guide means adapted to co-act with said film on the opposite side thereof, said guide means being so disposed that the motion of the film therebetween is a straight line, tangent to both curves, a guide roller around which said film is adapted to be passed before passing said guide means, and an optical system adapted to be focused upon said film at the point between said guide means where its motion is a straight line, whereby said film will always be in focus with respect to said optical system.

6. Apparatus for controlling the motion of a moving picture film during sound recording and reproduction which includes a guide roller over which the film is adapted to pass, a stationary curvilinear guide adapted to co-act with the film on one side thereof, a second curvilinear guide adapted to co-act with the film on the opposite side thereof, said guide means being so disposed that the motion of the film therebetween is a straight line, and a sprocket for moving said film through said device.

7. Apparatus for controlling the motion of a moving picture film for use in sound recording and reproduction which includes a guide roller for guiding the film to the sound recording and reproducing point, stationary curvilinear guide means adapted to co-act with the film on opposite sides and at different sections thereof, an optical system adapted to be focussed upon said film at a point between said guide means, whereby said film will always be in focus with respect to said optical system, and a sprocket for moving said film past said optical system.

8. Apparatus for controlling the motion of a moving film which includes means for moving the film, a curvilinear guide means adapted to co-act with the film on one side thereof, a second curvilinear guiding means adapted to co-act with the film on the opposite side thereof, said guide means being so disposed that the motion of the film therebetween is a straight line tangent to the curves of both guide means, an optical system adapted to be focussed upon the film at the point between said guide means where its motion is a straight line whereby the film will always be in focus with respect to said optical system, and rotating film guiding means for guiding the film into contact with said first mentioned curvilinear guide means.

MILTON HARRISON PAGE.